(12) United States Patent
Drabon et al.

(10) Patent No.: US 11,454,275 B2
(45) Date of Patent: Sep. 27, 2022

(54) BEARING ARRANGEMENT FOR A VEHICLE

(71) Applicant: Benteler Automobiltechnik GmbH, Paderborn (DE)

(72) Inventors: Rodscha Drabon, Salzkotten (DE); Dirk Rochell, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 1288 days.

(21) Appl. No.: 15/852,929

(22) Filed: Dec. 22, 2017

(65) Prior Publication Data

US 2018/0187717 A1 Jul. 5, 2018

(30) Foreign Application Priority Data

Dec. 29, 2016 (DE) .................... 10 2016 125 856.3

(51) Int. Cl.
| | |
|---|---|
| *B60G 11/107* | (2006.01) |
| *F16C 17/02* | (2006.01) |
| *B60G 11/12* | (2006.01) |
| *F16C 33/20* | (2006.01) |
| *B23P 15/00* | (2006.01) |
| *F16C 33/74* | (2006.01) |

(52) U.S. Cl.
CPC ............ *F16C 17/02* (2013.01); *B23P 15/003* (2013.01); *B60G 11/107* (2013.01); *B60G 11/12* (2013.01); *F16C 33/20* (2013.01); *B60G 2202/11* (2013.01); *B60G 2204/121* (2013.01); *B60G 2204/418* (2013.01); *B60G 2206/7104* (2013.01); *F16C 33/74* (2013.01); *F16C 2326/01* (2013.01)

(58) Field of Classification Search
CPC .......... F16F 1/30; F16F 1/3686; F16F 1/3846; F16F 1/3842; B60G 11/12; B60G 11/11; B60G 11/10; B60G 11/107; F16C 33/22; F16C 33/04; F16C 33/201
See application file for complete search history.

(56) References Cited

U.S. PATENT DOCUMENTS 3,152,846 A * 10/1964 Dumpis .................... B62D 7/16
 403/372
4,400,898 A * 8/1983 Christensen ............ E02F 9/006
 37/444
(Continued)

FOREIGN PATENT DOCUMENTS

DE 10 2015 117 349 A1 4/2017
EP 0 955 482 B1 11/1999
(Continued)

*Primary Examiner* — Daniel J Wiley
(74) *Attorney, Agent, or Firm* — Holland & Hart LLP

(57) ABSTRACT

The disclosure relates to a bearing arrangement for a bearing end of a fastening shackle in a vehicle body of a vehicle that includes an outer sleeve, an inner sleeve and a sleeve-shaped plastic sliding bearing. The inner sleeve is mounted in the outer sleeve so that the inner sleeve is able to slide. The sleeve-shaped plastic sliding bearing surrounds the inner sleeve and is connected to the inner sleeve in a rotationally fixed manner. The sleeve-shaped plastic sliding bearing is also longer than the outer sleeve and is delimited by a first sleeve rim that protrudes beyond the outer sleeve, where the first sleeve rim is configurable to be form-locked and to resist rotation.

19 Claims, 3 Drawing Sheets

(56) References Cited

U.S. PATENT DOCUMENTS

| | | | | |
|---|---|---|---|---|
| 4,840,395 | A * | 6/1989 | Sturmon | B60G 7/001 |
| | | | | 280/86.75 |
| 4,917,509 | A | 4/1990 | Takano | |
| 5,263,778 | A * | 11/1993 | Jordens | B60G 7/00 |
| | | | | 384/275 |
| 5,286,014 | A * | 2/1994 | Chakko | F16F 7/06 |
| | | | | 267/293 |
| 5,328,160 | A | 7/1994 | McLaughlin | |
| 6,273,632 | B1 * | 8/2001 | Takahashi | F16C 11/045 |
| | | | | 403/14 |
| 6,474,631 | B2 * | 11/2002 | Hadano | F16F 1/3814 |
| | | | | 267/140.3 |
| 6,694,571 | B2 * | 2/2004 | Albright | E02F 9/006 |
| | | | | 16/386 |
| 7,325,796 | B2 * | 2/2008 | Moreland | F16F 1/3842 |
| | | | | 267/293 |
| 8,376,648 | B2 * | 2/2013 | Marshall | F16C 11/045 |
| | | | | 403/161 |
| 8,430,593 | B2 * | 4/2013 | Gokita | F16C 11/04 |
| | | | | 403/151 |
| 9,365,278 | B2 * | 6/2016 | Blanton | B64C 1/00 |
| 2003/0057622 | A1 | 3/2003 | Bovio et al. | |
| 2015/0375788 | A1 * | 12/2015 | Yun | F16F 1/3842 |
| | | | | 267/292 |

FOREIGN PATENT DOCUMENTS

| | | | |
|---|---|---|---|
| GB | 648547 | A | 1/1951 |
| GB | 856943 | A | 9/1951 |
| GB | 856567 | A | 12/1960 |
| JP | 2007253758 | A | 10/2007 |

* cited by examiner

BEARING ARRANGEMENT FOR A VEHICLE

CROSS-REFERENCE TO RELATED APPLICATIONS

This application claims priority to German patent application No. 10 2016 125 856.3, entitled "Lageranordnung für ein Fahrzeug", and filed on Dec. 29, 2016 by the assignee of this application, the entire disclosure of which is incorporated by reference for all purposes.

BACKGROUND

The present disclosure relates to a bearing arrangement for a bearing end of a fastening shackle in a vehicle body of a vehicle.

Axially rotatable, in particular slideable, bearings are usually formed by two bearing sleeves located one inside the other. The dynamic properties and wear of a bearing are determined in particular by the way in which the bearing is fastened in a bearing support. Usually, the inner sleeve of the bearing is fastened in the bearing support by way of a screw connection, whereby a contact surface of the bearing support or a thrust washer delimits the bearing.

This type of fastening results in a very small radial distance between the axis of rotation of the bearing and the bearing support. As a result, the inner sleeve of the bearing and the bearing support have to absorb greater forces compared to a fastening further away from the axis. In addition, the secure fit of the bearing in this manner of fastening is determined by the tightening torque of the screw connection, so that the axial screw connection may withstand tangentially acting torques of the bearing. This increases the mechanical load on the bearing, so that in particular the breakaway torque, running resistance and smoothness of the bearing may deteriorate.

In addition, friction between the bearing support and the bearing or between the thrust washer and the bearing may lead to increased wear. This results in a reduced service life of the bearing or an increased maintenance effort for the bearing.

SUMMARY

The object of the present disclosure is therefore to provide a more efficient type of bearing arrangement which improves the manner of fastening, the dynamic properties and the durability of a bearing.

This object is solved by the features of the independent claims. Examples form the subject matter of the description, the figures and the dependent claims.

The present disclosure is based on the discovery that the above problem can be solved by a sleeve-shaped plastic sliding bearing which is inserted between the bearing sleeves and where the sleeve-shaped plastic sliding bearing has a sleeve rim with an anti-rotation means. The sleeve rim is in particular configured to hold in a form-fitting manner a bearing end plate or a bearing support, wherein a radial profile of the sleeve rim engages in a radial profile of the bearing end plate or bearing support.

According to a first aspect, the disclosure relates to a bearing, arrangement for a bearing end of a fastening shackle in a vehicle body of a vehicle, comprising an outer sleeve, an inner sleeve, a bearing end plate and a sleeve-shaped plastic sliding bearing, wherein the sleeve-shaped plastic bearing surrounds the inner sleeve and is connected to the inner sleeve in a rotationally fixed manner, and wherein the inner sleeve is mounted in the outer sleeve in such a way as to be able to slide, wherein the sleeve-shaped plastic sliding bearing is longer than the outer sleeve and is delimited by a first sleeve rim which protrudes beyond the outer sleeve, wherein the first sleeve rim is shaped for a form-locking anti-rotation means of the sleeve-shaped plastic sliding bearing.

The outer sleeve and the bearing inner part, including the in particular materially bonded or form-fitting assembly composed of the sleeve-shaped plastic sliding bearing and the inner sleeve, can form a two-part, axially slideable bearing. A rotationally symmetrical shape of the sleeve-shaped plastic sliding bearing and of the inner surface of the outer sleeve may improve the rotatable mounting of the bearing inner part in the outer sleeve.

Deviations from a rotationally symmetrical shape may be depressions or structures in the sleeve-shaped plastic sliding bearing or in the inner lateral surface of the outer sleeve which do not impede the ability to slide. By virtue of these structures, cavities which can serve to hold a lubricant can be formed between the sleeve-shaped plastic sliding bearing and the outer sleeve. The lubricant thus introduced between the sleeve-shaped plastic sliding bearing and the outer sleeve may improve the sliding properties of the bearing arrangement.

The contact area between the sleeve-shaped plastic sliding bearing and the inner lateral surface of the outer sleeve may also be changed by these structures. For instance, the surface pressure may be changed so that the dynamic properties of the bearing arrangement can be adapted.

In one example, the bearing arrangement can be fastened axially by way of the anti-rotation means and is configured in particular for fastening to a vehicle body.

In one example, the first sleeve rim for the form-locking anti-rotation means has a polygonal cross-section, in particular a hexagonal cross-section, or an asymmetrical cross-section, in particular a beveled or single-edged cross-section, or an oval cross-section.

The shape of anti-rotation means and of a counterpart of the anti-rotation means, in particular a bearing end plate, can bring about a change in the forces acting on the anti-rotation means. Starting from a rotational movement of the bearing arrangement about a longitudinal axis of the bearing arrangement, tangential forces act on the counterpart of the anti-rotation means. If the anti-rotation means is configured as a polygonal cross-section, a portion of the tangential forces is concentrated at the corner points of the polygonal cross-section, so that the sleeve rim and the counterpart of the anti-rotation means are exposed to increased force at the corner points. This results in greater resistance to deformation of the material of the first sleeve rim and of the counterpart of the anti-rotation means. By a combination of the shape of anti-rotation means and the choice of material for the anti-rotation means and for the first sleeve rim, in particular the choice of plastic, a desired transmission of forces between the first sleeve rim and the counterpart of the anti-rotation means and consequently between the sleeve-shaped plastic sliding bearing and the counterpart of the anti-rotation means can be obtained. In particular, the secure fit of the counterpart of the anti-rotation means on the bearing arrangement can be achieved as a result.

In one example, the outer sleeve is not shaped in a rotationally symmetrical manner and in particular is formed as an outer sleeve of a fastening shackle or can be inserted in a fastening shackle. The fastening shackle can form a fastening possibility for the bearing arrangement.

The fastening shackle may be configured to hold a spring, in particular a leaf spring. The fastening shackle together with the bearing arrangement thus forms a supported fastening possibility for a spring, in particular for supported fastening to a vehicle.

In one example, the bearing arrangement has a bearing end plate, wherein the bearing end plate has an opening, into which the first sleeve rim is introduced with a form fit and is held in the opening in a form-fitting and non-rotatable manner.

In one example, the bearing end plate may have a depression instead of an opening for form-fitting connection to the first sleeve rim. In this example, the inner sleeve is shorter than or the same length as the sleeve-shaped plastic sliding bearing and does not protrude beyond the first sleeve rim. The anti-rotation means may thus be formed for example between the first sleeve rim and the bearing end plate on the end face of the first sleeve rim, or the anti-rotation means may be supplemented by a for the anti-rotation means on the end face of the first sleeve rim.

In one example, the opening for the form-locking anti-rotation means has a geometric shape which corresponds to the geometric shape of the first sleeve rim. If the anti-rotation means and the first sleeve rim are scaled appropriately, a seal between the anti-rotation means and the first sleeve rim, and therefore a seal of the bearing arrangement, can be achieved in addition to a tight form fit.

In one example, the form-locking anti-rotation means is brought about by an interlocking of the first sleeve rim with the opening. The interlocking may be achieved by a shaped profile on the surface of the sleeve rim and a shaped profile on the surface of the opening, wherein the shaped profile of the surface of the opening corresponds at least partially to the negative profile of the surface of the sleeve rim. In addition to the non-rotatable form fit, a sealing of the sleeve-shaped plastic sliding bearing with respect to the bearing end plate can be achieved by way of the interlocking.

In one example, the bearing end plate has a circumferential seal which seals the sleeve-shaped plastic sliding bearing with respect to the outer sleeve.

In one example, the sleeve-shaped plastic sliding bearing is delimited by a second sleeve rim, wherein the second sleeve rim is shaped to form a collar which is configured to support the outer sleeve in the axial direction.

If the sleeve rims have a smaller external diameter than the internal diameter of the outer sleeve, the outer sleeve can be displaced axially relative to the inner sleeve along a longitudinal axis of the bearing arrangement. This can be used to permit axial movement, which thus does not lead to mechanical loading, in particular pressure or friction loading, of the bearing arrangement.

In one example, the second sleeve rim has a circumferential seal which seals the sleeve-shaped plastic sliding bearing with respect to the outer sleeve.

In one example, the respective circumferential seal is configured as a ring seal, in particular as an O-ring seal or an X-ring seal or a D-ring seal.

The seals in the bearing end plate and/or in the second sleeve rim are suitable to prevent lubricant from escaping, in particular from being flushed out, from the bearing arrangement. In addition, the seals may prevent most or any dirt from entering the bearing.

In one example, the sleeve-shaped plastic sliding bearing is formed in one piece from plastic, in particular from injection-molded plastic, and the inner sleeve and the outer sleeve are formed from metal. The one-piece plastic sleeve which forms the sleeve-shaped plastic sliding bearing may be made for example by a plastic injection-molding process in winch plastic is injected between the inner sleeve and the outer sleeve. In this way, manufacturing efficiency may be achieved.

In one example, the sleeve-shaped plastic sliding bearing is injection-molded onto the inner sleeve. In this way, manufacturing efficiency may be achieved.

In one example, an outer surface of the inner sleeve, which faces towards the sleeve-shaped plastic sliding bearing, has a knurling.

By virtue of the knurling, a force-fit or form-fit connection of the sleeve-shaped plastic sliding bearing to the inner sleeve can be achieved. The knurling may be formed axially, transversely or diagonally in relation to a longitudinal axis of the bearing arrangement. The adhesion between the inner sleeve and the sleeve-shaped plastic sliding bearing can be increased as a result. The orientation of the knurling determines the adhesion and sliding friction resistance between the sleeve-shaped plastic sliding bearing and the inner sleeve; an axial orientation can reduce slip, a transverse orientation can reduce axial displacements, and a diagonal orientation brings about a combination of slip reduction and reduction of axial displacements.

Another example of the knurling is a helical knurling. In conjunction with axial fixing of the sleeve-shaped plastic sliding bearing, for example by supporting the bearing end plate and the second collar-shaped sleeve rim on the outer sleeve, a force-fit and form-fit connection between the sleeve-shaped plastic sliding bearing and the inner sleeve can be achieved.

In one example, the sleeve-shaped plastic sliding bearing or the lateral surface of the outer sleeve facing towards the sleeve-shaped plastic sliding bearing has at least one depression, in particular a pocket-shaped depression, for holding a lubricant, in particular a permanent lubricant.

Friction between an outer surface of the sleeve-shaped plastic sliding bearing and the lateral surface facing towards the sleeve-shaped plastic sliding bearing can be reduced by introducing lubricant. In this way, lower breakaway torque of the bearing arrangement may be achieved.

The depressions make it possible to increase the amount of lubricant in the bearing arrangement so that there is no need to refill or relubricate the bearing arrangement during the service life of the bearing arrangement. In this way, reduced maintenance efforts and an increased service life of the bearing arrangement due to less wear of the bearing arrangement may be achieved.

According to a second aspect, the disclosure relates to a fastening arrangement for a motor vehicle, comprising a fastening shackle which has a bearing end; and comprising the bearing arrangement which is arranged in the bearing end.

In one example, the outer sleeve is inserted or pressed into an opening of the bearing end of the fastening shackle, the outer sleeve being an outer sleeve of a fastening shackle.

According to a third aspect, the disclosure relates to a method for producing a bearing arrangement for a bearing end of a fastening shackle in a vehicle body of a vehicle. The method comprises providing an outer sleeve and an inner sleeve, the inner sleeve being longer than the outer sleeve, injection-molding a sleeve-shaped plastic sliding bearing onto the inner sleeve in order to obtain a sleeve-shaped plastic sliding bearing which is connected to the inner sleeve in a rotationally fixed manner and where the sleeve-shaped plastic sliding bearing is mounted such as to be able to slide relative to the outer sleeve, where the plastic sliding bearing is longer than the outer sleeve and is delimited by a first sleeve rim and protrudes beyond the outer sleeve, and shaping the first sleeve rim for a form-locking anti-rotation means of the sleeve-shaped plastic sliding bearing.

In one example, the sleeve-shaped plastic sliding bearing is injection-molded onto the inner sleeve and the assembly composed of inner sleeve and sleeve-shaped plastic sliding bearing is then inserted into the outer sleeve in order to form the bearing arrangement.

In one example, plastic for the sleeve-shaped plastic sliding bearing is injected between the inner sleeve and the outer sleeve. In this case, the plastic is injection-molded onto the inner sleeve.

In one example, the cross-section of the first sleeve rim for the form-locking anti-rotation means is shaped to form a polygonal cross-section, in particular a hexagonal cross-section, or an asymmetrical cross-section, in particular a beveled or single-edged cross-section, or an oval cross-section.

In one example, the cross-sectional shape of the first sleeve rim is formed at the same time as the sleeve-shaped plastic sliding bearing is injection-molded onto the inner sleeve.

In one example, the first sleeve rim is connected in a form-fitting and non-rotatable manner to a bearing end plate, which has an opening into which the first sleeve rim is introduced with a form fit. In particular, the bearing end plate is pressed onto the first sleeve rim.

In one example, a lubricant is introduced between the sleeve-shaped plastic sliding bearing and the outer sleeve, where the lubricant reduces the friction between the sleeve-shaped plastic sliding bearing and the outer sleeve.

In one example, seals are inserted in the bearing end plate and the second sleeve rim so as to reduce or prevent any escape of lubricant from the bearing arrangement.

In one example, the bearing arrangement is sealed exclusively via the bearing end plate and the collar-shaped second sleeve rim, so that there is no need for additional seals.

Further features of the method are directly apparent from the shape or structure of the bearing arrangement.

BRIEF DESCRIPTION OF THE DRAWINGS

Further examples of the disclosure ill be explained in greater detail with reference to the appended drawings, in which.

DETAILED DESCRIPTION OF THE DRAWINGS

Figure 1:
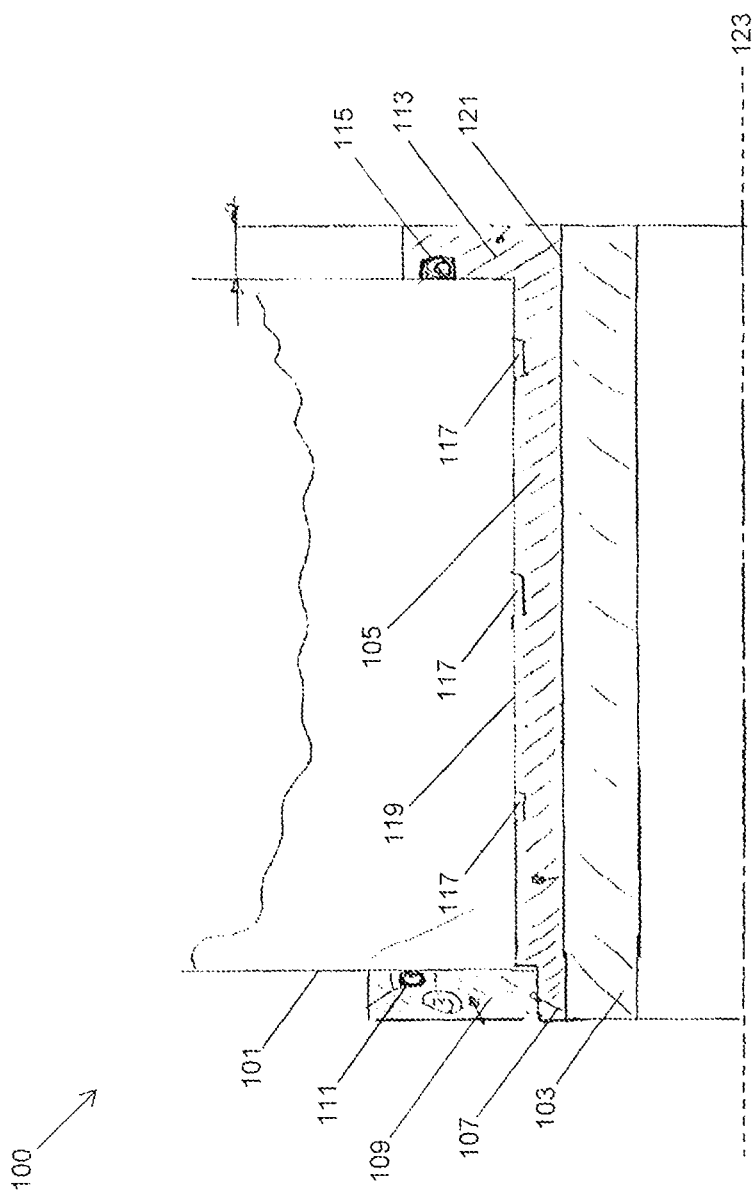
FIG. 1 shows a bearing arrangement in accordance with the present disclosure.

FIG. 1 shows a cross-section of a bearing arrangement 100, comprising an outer sleeve 101, an inner sleeve 103 and a sleeve-shaped plastic sliding bearing 105. The sleeve-shaped plastic sliding bearing 105 surrounds the inner sleeve 103 and is connected to the inner sleeve in a rotationally fixed manner. The inner sleeve 103 is mounted in the outer sleeve 101 in such a way as to be able to slide, wherein the sleeve-shaped plastic sliding bearing 105 is longer than the outer sleeve 101 and is delimited by a first sleeve rim 107 which protrudes beyond the outer sleeve 101, wherein the first sleeve rim 107 is shaped for a form-locking anti-rotation means of the sleeve-shaped plastic bearing 105. The illustrated cross-section of the bearing arrangement is formed along a longitudinal axis of the bearing arrangement, wherein the portion of the cross-section up to the central axis 123 of the inner sleeve 103 is shown. A longitudinal axis of the bearing arrangement 100 is, for example, the central axis 123 of the inner sleeve 103.

In an example as shown in FIG. 1, the sleeve-shaped plastic sliding bearing 105 is delimited by a second sleeve rim 113, wherein the second sleeve rim 113 is shaped to form a collar. The second sleeve rim 113 surrounds the outer sleeve 101 at least partially on the end face of the outer sleeve 101.

In an example as shown in FIG. 1, the bearing arrangement 100 has a bearing end plate 109, wherein the bearing end plate 109 has an opening, into which the first sleeve rim 107 is introduced with a form fit and is held in the opening in a form-fitting and non-rotatable manner.

In one example, the bearing arrangement 100 is rotationally symmetrical with respect to the central axis 123 of the inner sleeve 103, so that the further portion of the cross-section is a mirror image of the illustrated portion of the cross-section.

In one example, the bearing end plate 109 and/or the second sleeve rim 113 has a circumferential seal 111 or 115 which seals the sleeve-shaped plastic sliding bearing 108 with respect to the outer sleeve 101. The seals 111, 115 can be inserted with a form fit into a depression provided in the bearing end plate 109 or the second sleeve rim 113, respectively.

In one example, the bearing end plate 109 and/or the second sleeve rim 113 are located on the end faces of the outer sleeve 101.

In one example, the bearing end plate 109 and/or the second sleeve rim 113 are located at a distance from the end face of the outer sleeve 101 and only the seals 111, 115 are in direct contact with the outer sleeve 101. This may reduce the friction of the bearing arrangement 100 and contribute to a lower breakaway torque of the bearing arrangement 100.

The lubricant pockets 117 may run around the entire circumference or may be limited in terms of their circumferential length.

In one example, the thickness of the sleeve-shaped plastic sliding bearing 105 is greater than the thickness of the first sleeve rim 107 which protrudes beyond the outer sleeve 101. This results in a step between the sleeve rim 107 and the section of the sleeve-shaped plastic sliding bearing 105 that is connected to the outer sleeve 101 in such a way as to be able to slide.

In one example, the sleeve-shaped plastic sliding bearing 105 ends flush with the inner sleeve 103 at both sides. This includes the extensions of the sleeve-shaped plastic sliding bearing 105 in the form of the first sleeve rim 107 and the second sleeve rim 113.

Figure 2:
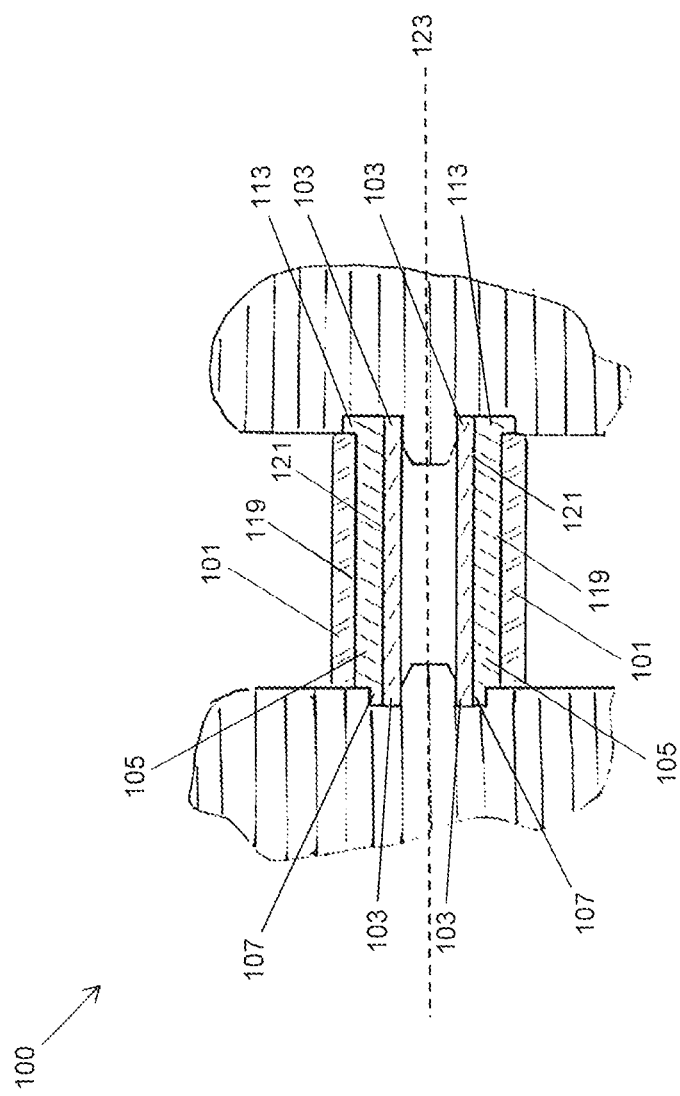
FIG. 2 shows a bearing arrangement in accordance with the present disclosure.

FIG. 2 shows a cross-section of a schematic diagram of a bearing arrangement 100 comprising an outer sleeve 101, an inner sleeve 103 and a sleeve-shaped plastic sliding bearing 105. The sleeve-shaped plastic sliding bearing 105 is longer than the outer sleeve 101 and is delimited by a first sleeve rim 107 which protrudes beyond the outer sleeve 101. A second sleeve rim 113, which may be formed in the manner of a collar, delimits the sleeve-shaped plastic sliding bearing 105 and partially surrounds the outer sleeve 101. The second sleeve rim 113 protrudes beyond the outer sleeve 101 but may end flush with the inner sleeve 103. The illustrated cross-section of the bearing arrangement is formed along the central axis 123.

In one example, the outer sleeve 101 rests with the lateral surface 119 on the sleeve-shaped plastic sliding bearing 105 in such a way as to be able to slide.

In one example, the sleeve-shaped plastic sliding bearing 105 is connected to the inner sleeve 103 in a materially bonded and/or force-fitting manner by way of an outer surface 121 of the inner sleeve 103 facing towards the sleeve-shaped plastic sliding bearing 105.

The material bond between the inner sleeve 103 and the sleeve-shaped plastic sliding bearing 105 may take place by adhesion or cohesion and may be reinforced by a structure formed in the outer surface 121 of the inner sleeve 103, in particular a knurling.

Figure 3:
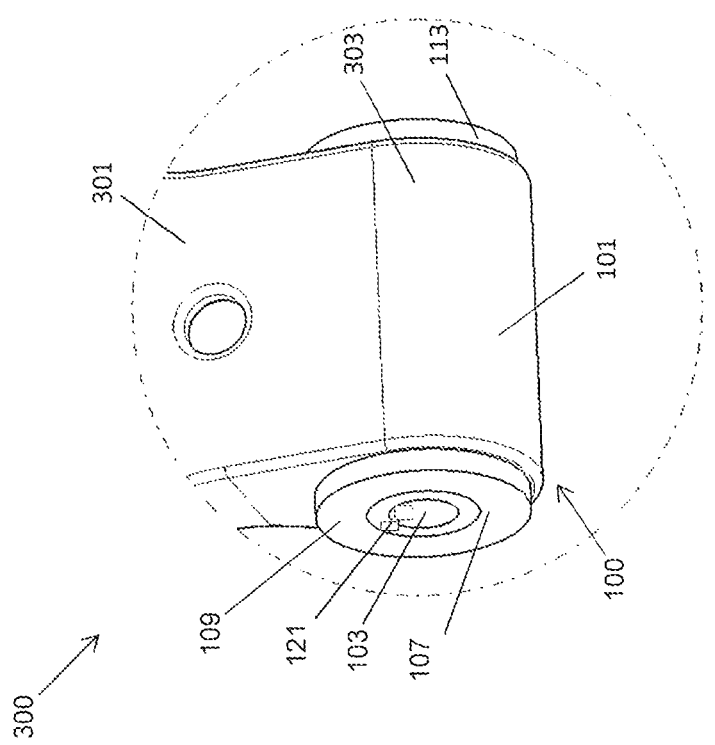
FIG. 3 shows a fastening arrangement in accordance with the present disclosure.

FIG. 3 shows a fastening arrangement 300 for a motor vehicle, comprising a fastening, shackle 301, which has a bearing end 303, and comprising the bearing arrangement 100, which is arranged in the bearing end 303.

In one example, the bearing end 303 is shaped in the manner of a sleeve and replaces the outer sleeve 101. A reduction in the weight of the bearing arrangement and a particular manufacturing efficiency of the bearing arrangement can thus be achieved. In particular, the fastening shackle can be produced in one piece.

To produce the fastening arrangement 300, it is possible to carry out a production method which comprises providing a fastening shackle 301 having the bearing end 303 and the outer sleeve 101, inserting the inner sleeve 103 into the outer sleeve 101, injection-molding a plastic onto the inner sleeve 103 in order to create a sleeve-shaped plastic sliding bearing 105, and inserting, in particular pressing, the outer sleeve 101 into the bearing end 303.

The inner sleeve 103 can be clamped in a U-shaped bearing support so that a force-fitting and/or form-fitting connection is formed between the U-shaped bearing support and the inner sleeve 103. In addition, the bearing arrangement may be clamped with the bearing end plate 109 and/or the second sleeve rim 113 in the U-shaped bearing support so that a force-fitting and/or form-fitting connection is formed between the bearing end plate 109 and the U-shaped bearing support and/or between the second sleeve rim 113 and the U-shaped bearing support.

The secure fit of the clamping of the inner sleeve 103, of the hearing end plate 109 and/or of the second sleeve rim 113 in the U-shaped bearing support can be reinforced by an axial screw connection. For instance, the axial screw connection may be used if the inner sleeve 103, the bearing end plate 109 and/or the second sleeve rim 113 are inserted loosely in the U-shaped bearing support.

LIST OF REFERENCE NUMBERS 100 bearing arrangement
101 outer sleeve
103 inner sleeve
105 sleeve-shaped plastic sliding bearing
107 first sleeve rim
109 bearing end plate
111 circumferential seal
113 second sleeve rim
115 circumferential seal
117 depression
119 lateral surface
121 outer surface
123 central axis
300 fastening arrangement
301 fastening shackle
303 bearing end

What is claimed is:

1. A bearing arrangement in a vehicle body of a vehicle, comprising:
    an outer sleeve;
    an inner sleeve mounted in the outer sleeve and configured to slide relative to the outer sleeve;
    a sleeve-shaped plastic sliding bearing that surrounds the inner sleeve and is connected to the inner sleeve in a rotationally fixed manner, wherein the sleeve-shaped plastic sliding bearing is longer than the outer sleeve and is delimited by a first sleeve rim that protrudes beyond the outer sleeve, and wherein the first sleeve rim is configured to be form-locked and to resist rotation; and
    a bearing end plate, wherein an opening of the bearing end plate is configured to introduce the first sleeve rim into the opening of the bearing end plate with a form fit, and wherein the opening of the bearing end plate is further configured to hold the first sleeve rim in a form-fitting and non-rotatable manner.

2. The bearing arrangement according to claim 1, wherein the first sleeve rim comprises a polygonal cross-section or an asymmetrical cross-section.

3. The bearing arrangement according to claim 2, wherein the polygonal cross-section comprises a hexagonal cross-section, and wherein the asymmetrical cross-section comprises a beveled or single-edged cross-section or an oval cross-section.

4. The bearing arrangement according to claim 1, wherein the outer sleeve forms a second outer sleeve of a fastening shackle or is inserted in the fastening shackle.

5. The bearing arrangement according to claim 1, wherein the opening of the bearing end plate has a geometric shape that corresponds to a geometric shape of the first sleeve rim.

6. The bearing arrangement according to claim 1, wherein the first sleeve rim interlocks with the opening of the bearing end plate.

7. The bearing arrangement according to claim 1, wherein the bearing end plate comprises a circumferential seal configured to seal the sleeve-shaped plastic sliding bearing with respect to the outer sleeve.

8. The bearing arrangement according to claim 7, wherein the circumferential seal comprises any of: an O-ring seal or an X-ring seal or a D-ring seal.

9. The bearing arrangement according to claim 1, wherein the sleeve-shaped plastic sliding bearing is delimited by a second sleeve rim, wherein the second sleeve rim is shaped to form a collar configured to support the outer sleeve in an axial direction.

10. The bearing arrangement according to claim 9, wherein the second sleeve rim comprises a further circumferential seal configured to seal the sleeve-shaped plastic sliding bearing with respect to the outer sleeve.

11. The bearing arrangement according to claim 10, wherein the further circumferential seal comprises a ring seal.

12. The bearing arrangement according to claim 11, wherein the ring seal comprises any of: an O-ring seal or an X-ring seal or a D-ring seal.

13. The bearing arrangement according to claim 1, wherein the sleeve-shaped plastic sliding bearing is formed in one piece from a plastic, and wherein the inner sleeve and the outer sleeve are formed from a metal.

14. The bearing arrangement according to claim 1, wherein the sleeve-shaped plastic sliding bearing is injection-molded onto the inner sleeve.

15. The bearing arrangement according to claim 1, wherein an outer surface of the inner sleeve faces towards the sleeve-shaped plastic sliding bearing and has a knurling.

16. The bearing arrangement according to claim 1, wherein the sleeve-shaped plastic sliding bearing or a lateral surface of the outer sleeve faces towards the sleeve-shaped plastic sliding bearing and has at least one depression configured to hold a lubricant.

17. A fastening arrangement for a motor vehicle, comprising:
   a fastening shackle that has a bearing end; and
   a bearing arrangement comprising:
      an outer sleeve;
      an inner sleeve mounted in the outer sleeve and configured to slide within the outer sleeve;
      a sleeve-shaped plastic sliding bearing that surrounds the inner sleeve and is connected to the inner sleeve in a rotationally fixed manner, wherein the sleeve-shaped plastic sliding bearing is longer than the outer sleeve and is delimited by a first sleeve rim that protrudes beyond the outer sleeve, and wherein the first sleeve rim is configured to be form-locked and to resist rotation; and
      a bearing end plate, wherein an opening of the bearing end plate is configured to introduce the first sleeve rim into the opening of the bearing end plate with a form fit, and wherein the opening of the bearing end plate is further configured to hold the first sleeve rim in a form-fitting and non-rotatable manner.

18. The fastening arrangement according to claim 17, wherein the outer sleeve is inserted or pressed into an opening of the bearing end of the fastening shackle, the outer sleeve being a second outer sleeve of the fastening shackle.

19. A method for producing a bearing arrangement in a vehicle body of a vehicle, comprising:
   providing an outer sleeve and an inner sleeve, the inner sleeve being longer than the outer sleeve;
   injection-molding a plastic sliding bearing onto the inner sleeve in order to obtain a sleeve-shaped plastic sliding bearing, wherein the sleeve-shaped plastic sliding bearing surrounds the inner sleeve, is connected to the inner sleeve in a rotationally fixed manner, is configured to slide relative to the outer sleeve, is longer than the outer sleeve, and is delimited by a first sleeve rim that protrudes beyond the outer sleeve;
   shaping the first sleeve rim to be form-locked and to resist rotation;
   providing a bearing end plate; and
   introducing the first sleeve rim into an opening of the bearing end plate with a form fit, wherein the opening of the bearing end plate is configured to hold the first sleeve rim in a form-fitting and non-rotatable manner.

* * * * *